US005494470A

United States Patent [19]

Beunas et al.

[11] Patent Number: 5,494,470

[45] Date of Patent: Feb. 27, 1996

[54] METHOD FOR THE MANUFACTURE OF A HELIX-COUPLED VANE LINE, LINE OBTAINED BY THE METHOD AND ELECTRON TUBE INCLUDING SUCH A LINE

[75] Inventors: Armel Beunas, Boulogne Billancourt; Jean-Marc Falguieres, Villeneuve le Roi; Henri Desmur, Fontenay Aux Roses, all of France

[73] Assignee: Thomson Tubes Electroniques, Velizy, France

[21] Appl. No.: 279,102

[22] Filed: Jul. 22, 1994

[30] Foreign Application Priority Data

Jul. 23, 1993 [FR] France .................................. 93 09103

[51] Int. Cl.$^6$ .............................. H01J 9/02; B23K 28/02

[52] U.S. Cl. ................................ 445/35; 445/46; 228/170

[58] Field of Search ........................ 445/35, 46; 228/170

[56] References Cited

U.S. PATENT DOCUMENTS

| | | | |
|---|---|---|---|
| 2,550,614 | 4/1951 | Spencer | 445/35 |
| 3,136,027 | 6/1964 | Beltz et al. | 445/35 |
| 3,679,993 | 7/1972 | Hentschel | 315/39.3 |
| 4,831,335 | 5/1989 | Wheeland et al. | 315/39.3 |
| 5,021,708 | 6/1991 | Nugues, et al. | 313/446 |
| 5,045,749 | 9/1991 | Desmur | 313/305 |
| 5,313,138 | 5/1994 | Desmur | 315/3 |
| 5,418,427 | 5/1995 | Cipolla et al. | 315/39.3 |

FOREIGN PATENT DOCUMENTS

| | | |
|---|---|---|
| 57746 | 5/1953 | France . |
| 1571805 | 6/1969 | France . |
| 2126186 | 10/1972 | France . |
| 89/04233 | 5/1989 | WIPO . |

*Primary Examiner*—A. Austin Bradley
*Assistant Examiner*—Jeffrey T. Knapp
*Attorney, Agent, or Firm*—Oblon, Spivak, McClelland, Maier & Neustadt

[57] ABSTRACT

A method for the manufacture of a helix-coupled vane line consists in cutting out, in a part comprising at least one channel, successive slots through the channel that extend beyond the channel so as to obtain portions of turns each fixedly joined to a vane; cutting out, in another part, a succession of fingers that are all fixedly joined to each other; connecting the turn portions to the fingers so that one end of a turn portion is connected to one end of a first finger and the other end of the turn portion is connected to the base of a second finger adjacent to the first finger; and separating the fingers from one another at their bases. Application of helix-coupled vane lines. Is most notably for crossed-field amplifiers.

15 Claims, 5 Drawing Sheets section bb′ section bb′ section bb'

METHOD FOR THE MANUFACTURE OF A HELIX-COUPLED VANE LINE, LINE OBTAINED BY THE METHOD AND ELECTRON TUBE INCLUDING SUCH A LINE

BACKGROUND OF THE INVENTION

1. Field of the Invention

The present invention relates to helix-coupled vane lines or structures and to the electron tubes comprising such lines, notably wideband crossed-field amplifiers.

It relates more particularly to a method for making helix-coupled vane lines such as these.

Wideband amplification is obtained, broadly speaking, by the interaction of a space charge wave conveyed by an electron beam and a microwave borne by a slow-wave line. During the interaction, there is synchronism between the electrons of the beam and the microwave.

2. Description of the Prior Art

Of the difficulties that arise in the development of crossed-field amplifiers, a large part is related to the designing of slow-wave lines.

To obtain a wide operating band, it is sought to make the dispersion of the line as small as possible and the coupling impedance as great as possible. These two conditions are contradictory and compromises have to be accepted.

Helix-coupled vane lines, also called helix-on-base lines have been developed with good results. They work in the fundamental mode. The helix, which has a length of several octaves, has each of its turns fixedly joined to a quarter-wave vane (or base). The vanes are all fixed to one and the same support which may be the casing, under vacuum, of the tube. These helix-coupled vane lines are far lighter and far more compact than other lines formed by waveguide elements, and they generate fewer parasitic oscillations.

The helix-coupled vane lines are generally curved in the form of a ring, but the two ends of the helix are not joined. There also exist lines such as these that are rectilinear. There also exists a known way of using lines with two helical lines fixedly joined to the same vanes. It is thus possible to obtain higher power values, essentially higher mean power values.

To make this helix-coupled vane line, each turn of a helix is brazed to vanes that are fixedly joined to one and the same support. This is a very delicate operation to perform, especially if the line is designed to be mounted in a tube working at high frequencies for the diameter of the wires forming the helix is extremely small: for example, it is of the order of one-tenth of a millimeter. It is difficult to make satisfactory contacts between one turn and another, and ensure the mechanical regularity of the position of each turn.

The matching of the crossed-field tubes using lines obtained by this method is difficult to reproduce from one tube to another. This method requires tools that are carefully designed and, therefore, expensive. The cost of manufacture of such tubes is then especially high.

SUMMARY OF THE INVENTION

The present invention is therefore aimed firstly at improving the performance characteristics of crossed-field tubes using helix-coupled vane lines and secondly at reducing their cost of manufacture. To this end, it proposes a line-manufacturing method of this type that improves manufacturing output, increases the regularity and precision of the line and costs far less than the known methods.

The method according to the invention consists in:

cutting out, in a part comprising at least one channel, successive slots through the channel that extend beyond the channel so as to obtain portions of turns each fixedly joined to a vane, cutting out a succession of fingers, all fixedly joined to each other, in at least one other part, connecting the turn portions to the fingers so that one end of a turn portion is connected to one end of a first finger and the other end of the turn portion is connected to the base of a second finger adjacent to the first finger, then separating the fingers from one another at their bases.

Preferably, the channel is a protruding channel.

Preferably, the slots are cut out by wire electro-erosion machining or wire electrical discharge machining. Preferably too, the fingers are cut out by wire electrical discharge machining. This technique makes it possible to obtain very precise contours. It also makes it possible to cut out several parts at the same time by superimposing them: this ensures high reproducibility of the cutting-out operation.

Preferably, the ends of the turn portions are brazed to the fingers.

Advantageously, the separation of the fingers can be done by penetration electrical discharge machining.

The channel may be a ring sector and the slots may be radial. The succession of fingers may also be in the form of a ring sector. In one variant, the channel may be rectilinear and the succession of fingers too.

The present invention also relates to a helix-coupled vane line obtained by this method. This line preferably has substantially rectangular helical turns.

This line may have only one helix or two. When there are two helices, they are superimposed and fixedly joined to the same vanes. Preferably, the two helices are wound in opposite directions to prevent the production of space harmonics harmful to the amplifier.

The present invention also relates to a crossed-field electron tube comprising a helix-coupled vane line obtained by the method.

BRIEF DESCRIPTION OF THE DRAWINGS

Other features and advantages of the invention shall appear from the following description illustrated by the figures, of which.

MORE DETAILED DESCRIPTION

The example that shall be described can be used to obtain a helix-coupled vane line. This line has the shape of a ring sector and is adapted to being mounted in a crossed-field amplifier tube. This line has two distinct ends. When it is mounted in a crossed-field amplifier tube, one of the ends is connected to a device for the injection of a microwave and the other end is connected to a device for the extraction of the microwave after amplification.

Figure 6A:
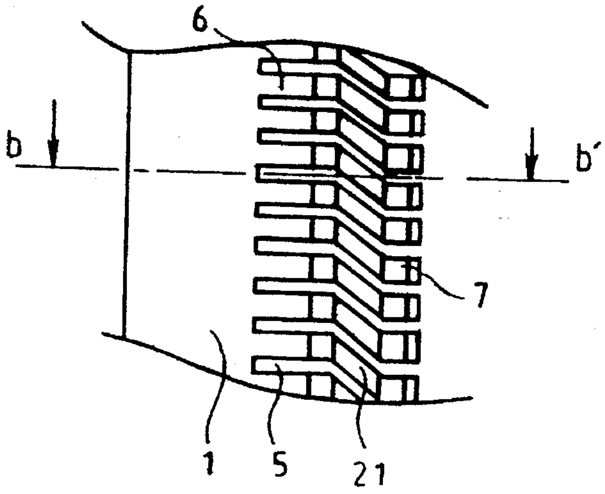
FIGS. 6*a* and 6*b* respectively show a top view and a cross-sectional view of a rectilinear helix-coupled vane line obtained by the method according to the invention.
Figure 6B:
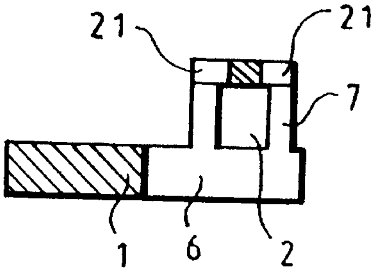

Instead of being in the form of a ring sector, the line could be rectilinear. It could of course include only one helix instead of two. FIGS. 6*a* and 6*b* illustrate the case of a rectilinear helix-coupled vane line.

Figure 1A:
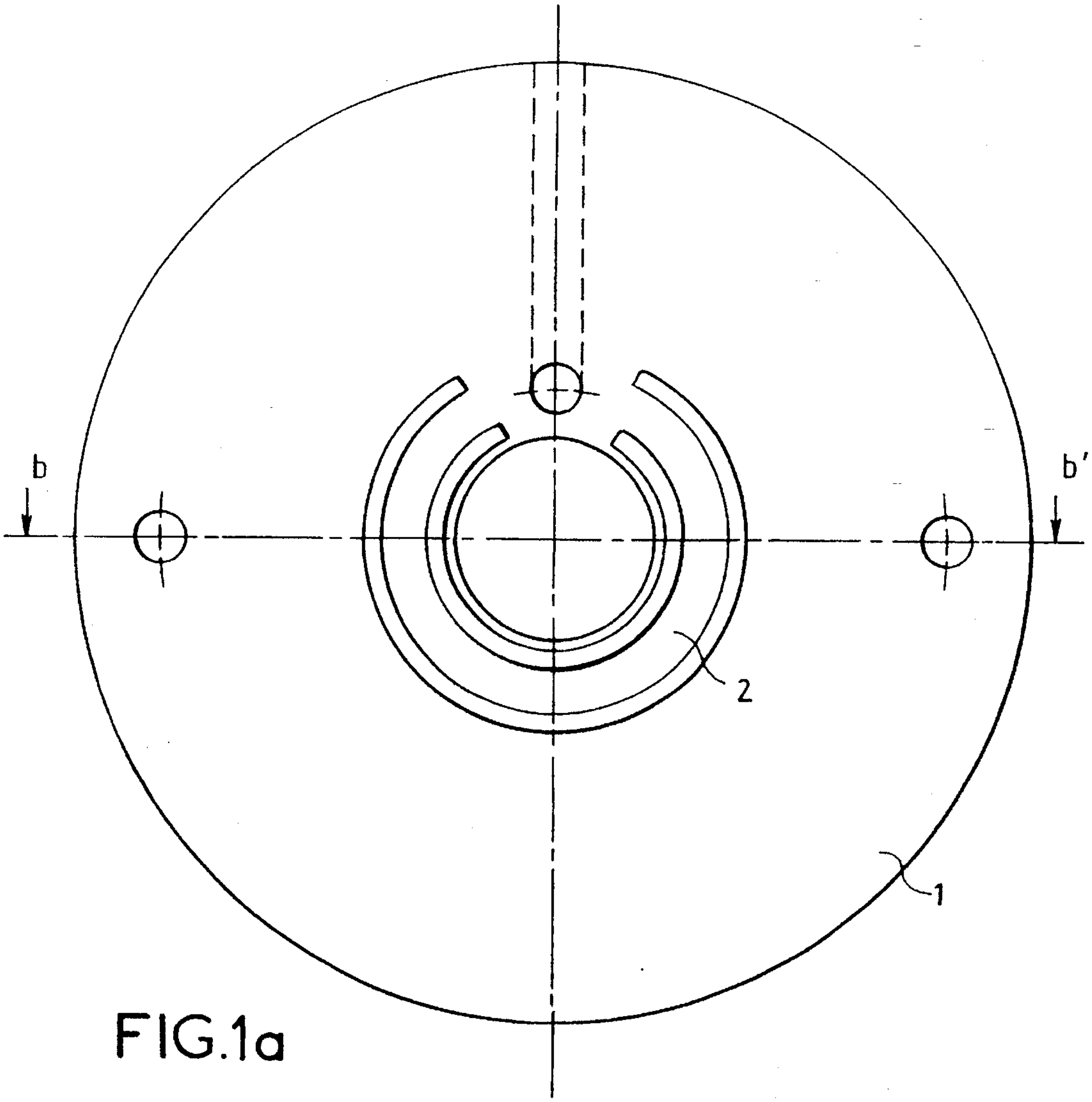
FIGS. 1*a* and 1*b* respectively show a top view and a cross-sectional view of a plate provided with two channels located on opposite faces.
Figure 1B:
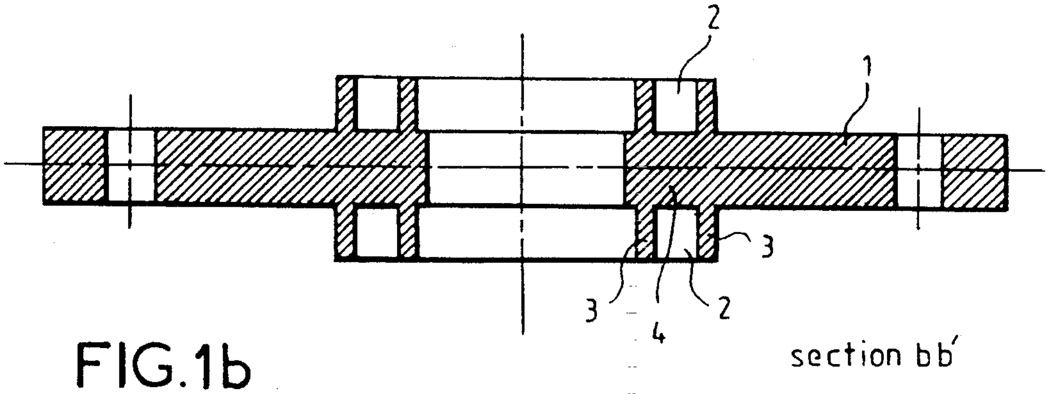

Reference will be made to FIGS. 1*a* and 1*b*.

The procedure starts with a part 1 made of an electrically conductive material having at least one channel 2.

FIG. 1*b* shows two channels 2 that are superimposed and opposite to each other by their bottom 4. The part 1 is a ring-shaped plate. The channels 2 are positioned on the main faces of the plate and have the shape of a ring sector. Their two ends are separated. In the example described, the channels 2 are located in the vicinity of the edge of the part 1. This is the lower edge of the ring. The two channels 2 have a substantially U-shaped cross-section with two facing sides 3.

This plate 1, provided with channels 2, may be obtained by a turning operation carried out on a thicker plate. The channels 2 are shown as projecting features, but it is possible that they do not extend beyond the main faces of the plate.

Figure 2A:
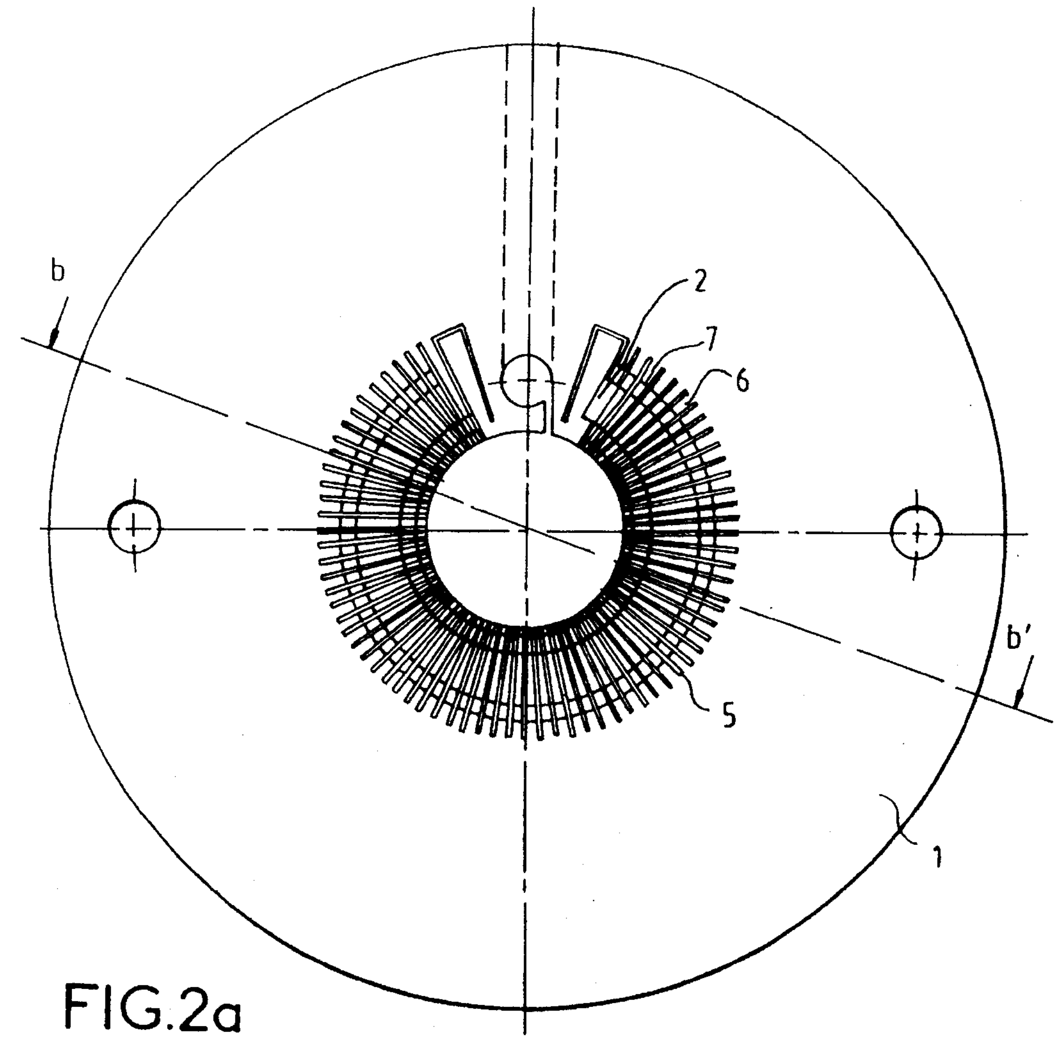
FIGS. 2*a* and 2*b* respectively show a top view and a cross-sectional view of the same plate after the cutting out of the radial slots.
Figure 2B:
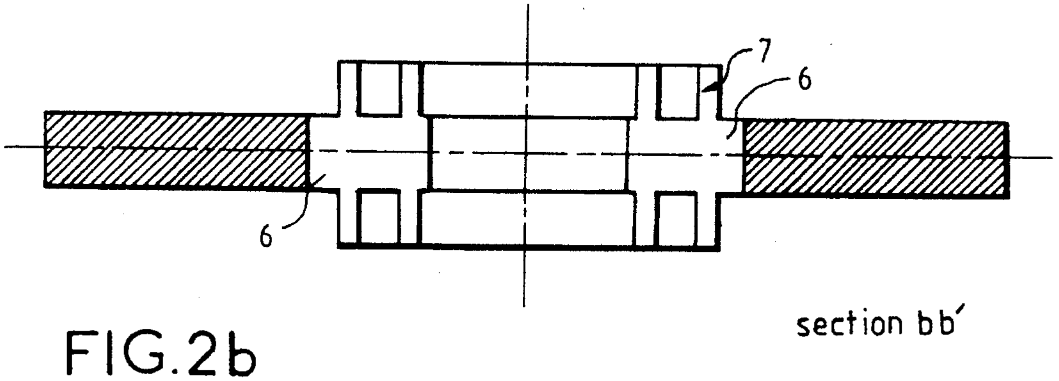

Reference is made to FIGS. 2*a*, 2*b*. To make the helix-coupled vane line, a succession of slots 5 is made through the channels 2. The slots are directed radially with respect to the plate 1. The bottom of the slots is located beyond the channel with respect to the center of the ring so as to create radial vanes 6 that go forward towards the channel 2.

The channels 2 are thus cut out into slices and each slice forms a portion 7 of a turn of the helix of the line. These turn portions are substantially U-shaped. Each turn portion 7 is fixedly joined to a vane 6. In the example described, two superimposed turn portions are fixedly joined to the same vane 6.

The slots 5 could advantageously be made by wire electrical discharge machining. This technique consists in generating sparks between an electrode-tool (in this case a conductive wire that goes through the part to be cut out) and the part to be cut out. The electrode-tool and the part to be cut out are insulated from each other by a dielectric material (generally a fluid). The machine tool that carries out this cutting operation may be digitally controlled. This makes it possible to carry out complex forms of cutting according to preset programs. With machines of this type, the movements of the wire are very precise and reproducible from one part to the next one.

It is also possible, if the dimensions of the slots permit it, to envisage the cutting out of these slots by milling or sawing.

Figure 3A:
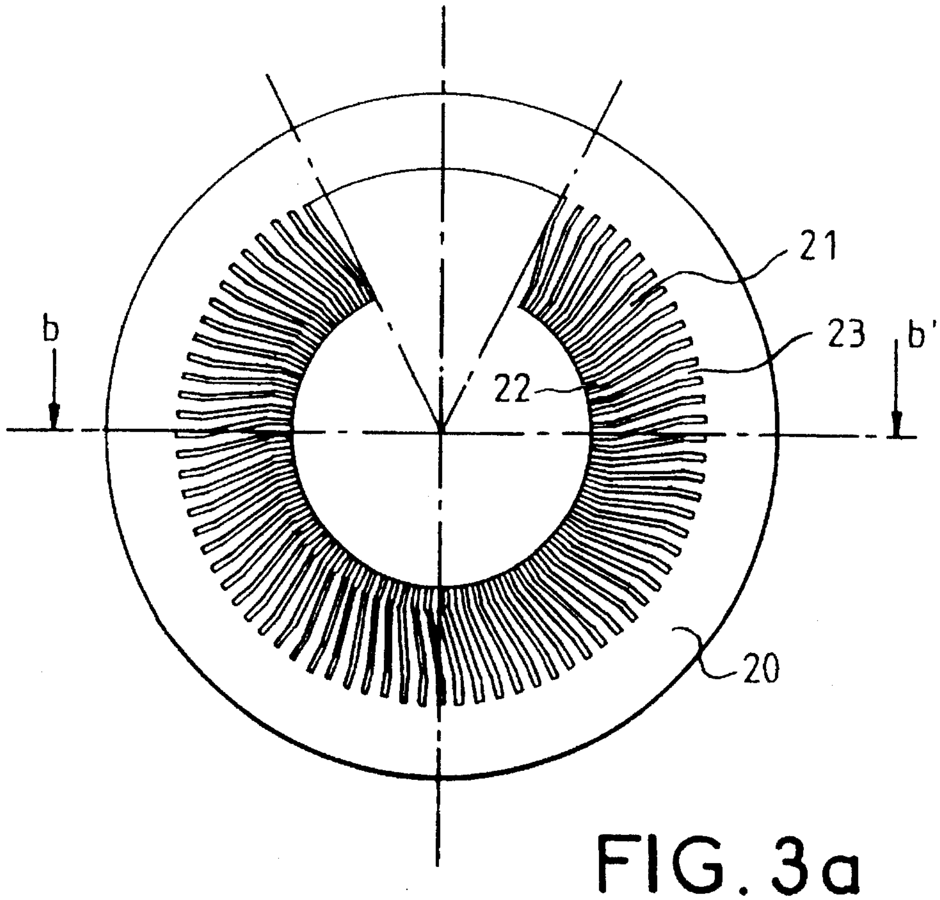
FIGS. 3*a* and 3*b* respectively show a top view and a cross-sectional view of a plate cut out with a succession of fingers.
Figure 3B:
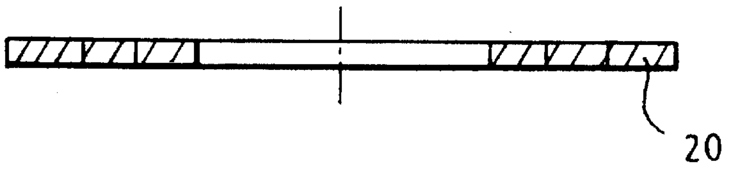

The next step of the method according to the invention consists in making elements that can be used to connect two succession turn portions 7. Reference is made to FIGS. 3*a*, 3*b*. The procedure starts with the second part 20 of electrically conductive material out of which a set of fingers 21, all fixedly joined to each other, will be cut. This part 20 is a plate. The set of fingers 21 forms a ring sector and the fingers 21 are approximately radiating.

In the example, the free ends 22 of the fingers are pointed to the center of the ring. An embodiment could have been designed, on the contrary, where it is the base 23 of the fingers 21 that is pointed towards the center of the ring.

Preferably, the first finger and the last finger of the assembly are joined to each other by their base 23.

The cutting out of the fingers 21 could advantageously be done by wire electrical discharge machining.

This technique has the advantage of enabling several plates to be cut out at the same time, in being superimposed. The second plate 20 is preferably finer than the first plate 1. Its thickness corresponds substantially to the thickness of the sides of the channels 2.

The next step of the method according to the invention consists in fixing the fingers 21 to the turn portions 7 so as to interconnect two adjacent turn portions 7.

Figure 4:
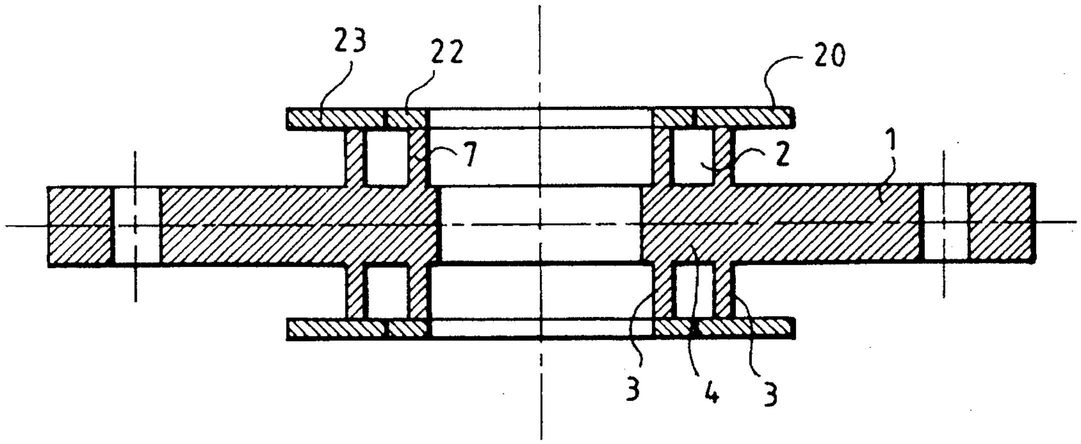
FIG. 4 shows a cross-sectional view of a curved helix-coupled vane line curved being manufactured by the method according to the invention.

Reference shall be made to FIG. 4. One end of a turn portion 7 is connected to the free end 22 of a first finger 21 and the other end of the same portion 7 is connected to the base 23 of a second finger 21 that is close to the first finger. Care has been taken to ensure that the cutting of the fingers is appropriate to this connection and, in the example described, the fingers will follow a slightly S-shaped path.

The link will advantageously be made by brazing. This brazing is relatively easy, for it is done flat and the parts to be brazed can be pressed together. The two helices can be wound in opposite directions.

Figure 5:
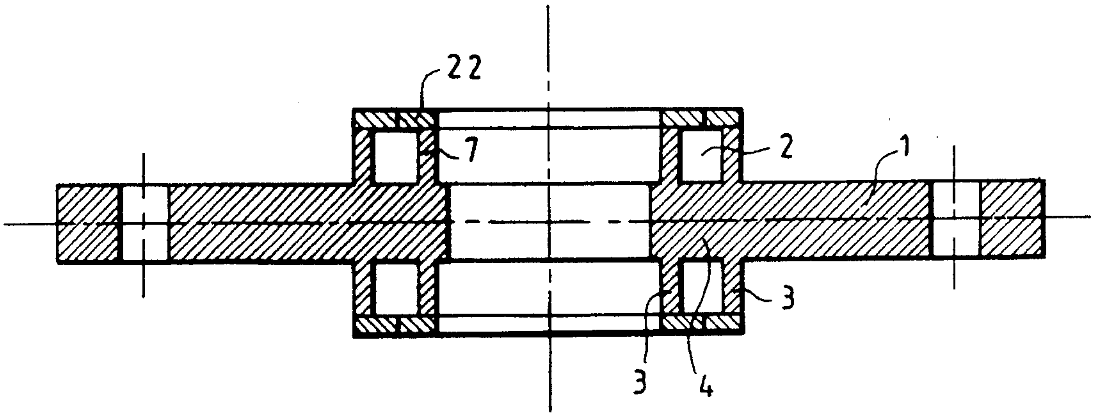
FIG. 5 shows a cross section of the line of FIG. 4 obtained by the method according to the invention.

To complete the helix, the next step consists in separating the fingers 21 from one another. To this end, the excess material will be removed at their base 23. In the example described, the excess material is located between the set of the fingers and the external edge of the plate 20. This removal of material can be done, for example, by penetration electrical discharge machining. The electrode-tool has an appropriate shape and it goes down into the part to be cut out in penetrating the material to be removed. When the excess material is removed, the helix-coupled vane line is completed. The fact of connecting the turn portions 7 with the fingers 21 and then separating the fingers makes it possible to obtain a helix. FIG. 5 shows a cross-section of the completed line after the excess material has been removed. In the example described, the helix has a rectangular cross-section, but this is only an example.

This type of coupled helix-coupled vane line is quite suited to being mounted in a wideband crossed-field amplifier tube.

The material of the line is a material that is a good conductor of electricity, such as copper for example.

FIGS. 6*a* and 6*b* show a top view and a cross-sectional view of a rectilinear helix-coupled vane line formed by the method according to the invention. The method of making the line conforms to what has been described earlier. The example represented shows only one channel 2 instead of two. The channel 2 is rectilinear instead of being curved. It can be made by machining. The succession of slots is cut out through the channel 2. The slots 5, instead of being radial, are kept parallel to each other and transversal to the channel 2. The vanes 6 are formed by extending the slots laterally beyond the channel 2. The next step consists in cutting out all the fingers 21. The fingers are all oriented in the same way. The set of fingers forms a sort of rectilinear comb. The step which consists in connecting the turn portions to the fingers conforms to what has been described. The last step consists in removing the excess material: it is a band of material that is removed instead of a ring. In the example described, the vanes 6 are shown to the left of the channel 2. They could be placed at the right or even at the o bottom 4 of the channel 2 if the part is thick enough.

Figure 7:
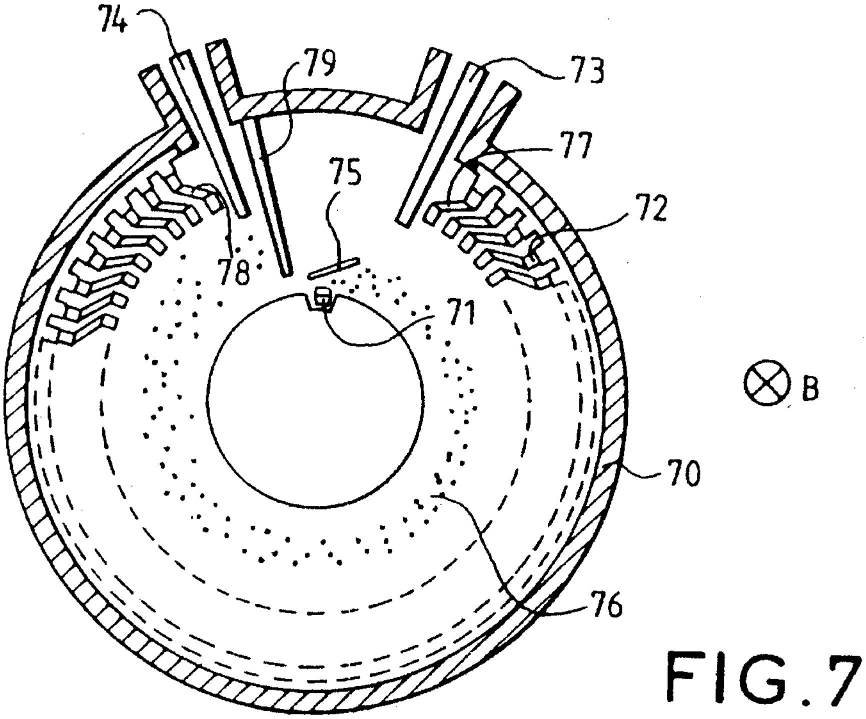
FIG. 7 shows a cross section of a crossed-field amplifier comprising a helix-coupled vane line obtained by the method according to the invention.

FIG. 7 shows a cross-section of a crossed-field amplifier comprising a line obtained by the method according to the invention. This tube is an injected electron beam tube. It is formed by a cylindrical casing 70 under vacuum. The cathode has the reference 71. The helix-coupled vane line 72 is fixedly joined to the envelope 70. An input terminal 3 is positioned at one end 77 of the line, and an output terminal 74 at the other end 78. The cathode 71 sends electrons to an anode 75, and these electrons from an electron beam 76 that interacts with a microwave injected into the input terminal 73 and extracted at the output terminal 74. The electrons are produced in the vicinity of the first end 77 of the line and collected by a collector 79 in the vicinity of the second end 78. A magnetic field B is produced by an appropriate device perpendicularly to the plane of the figure.

Although the tube shown is an injected beam tube, the use of a line of the type described is not limited to this type of tube. A tube with re-entrant beam could equally well be used.

What is claimed is:

1. A method for the manufacture of a helix-coupled vane line comprising:

cutting out, in a part comprising at least one channel, successive slots through the at least one channel that extend beyond the at least one channel so as to obtain turns portions each fixedly joined to a vane, cutting out, in another part, a succession of fingers that are all fixedly joined to each other, connecting the turn portions to the fingers so that one end of a turn portion is connected to one end of a first finger and the other end of the turn portion is connected to the base of a second finger adjacent to the first finger, separating the fingers from one another at their bases.

2. A method according to claim 1, wherein the slots are cut out by wire electrical discharge machining.

3. A method according to claim 1, wherein the succession of fingers is cut out by wire electrical discharge machining.

4. A method according to claim 1, wherein the turn portions are connected to the fingers by brazing.

5. A method according to claim 1, wherein the fingers are separated from one another by penetration electrical discharge machining.

6. A method according to claim 1, wherein the at least one channel comprises at least one protruding channel.

7. A method according to claim 1 wherein the turn portions are substantially rectangular.

8. A method according to claim 1, wherein the at least one channel is made by turning, has the shape of a ring sector.

9. A method according to claim 8, wherein the slots are cut out radially in the at least one channel.

10. A method according to claim 8, wherein the succession of fingers is cut out so as to form a ring sector.

11. A method according to claim 1, wherein the at least one channel is made by machining, this channel being rectilinear.

12. A method according to claim 11, wherein slots are cut out so as to be parallel to one another.

13. A method according to claim 11, wherein the succession of fingers is cut out so that it is rectilinear.

14. A method according to claim 1 wherein the at least one channel comprises two channels superimposed and opposite to each other by their bottom so that the helix-coupled vane line comprises two helices fixedly joined to the same vane.

15. A method according to claim 14, wherein the two helices are wound in opposite directions.

* * * * *